United States Patent
Xu

(10) Patent No.: US 9,363,834 B2
(45) Date of Patent: Jun. 7, 2016

(54) METHOD, USER EQUIPMENT AND SYSTEM FOR MAINTAINING A LARGE NUMBER OF CONNECTIONS

(75) Inventor: Hui Xu, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/004,721

(22) PCT Filed: Nov. 23, 2011

(86) PCT No.: PCT/CN2011/082765
§ 371 (c)(1),
(2), (4) Date: Sep. 12, 2013

(87) PCT Pub. No.: WO2012/151945
PCT Pub. Date: Nov. 15, 2012

(65) Prior Publication Data
US 2014/0155074 A1    Jun. 5, 2014

(30) Foreign Application Priority Data
Aug. 25, 2011   (CN) .......................... 2011 1 0246524

(51) Int. Cl.
H04W 72/00 (2009.01)
H04W 76/02 (2009.01)
H04W 76/00 (2009.01)
H04W 4/00 (2009.01)

(52) U.S. Cl.
CPC ............. *H04W 76/02* (2013.01); *H04W 4/005* (2013.01); *H04W 76/00* (2013.01)

(58) Field of Classification Search
CPC ...... H04W 76/02; H04W 4/005; H04W 76/00
USPC .......................................... 455/450; 370/338
See application file for complete search history.

(56) References Cited

U.S. PATENT DOCUMENTS

2006/0040690 A1*  2/2006  Lee et al. ........................ 455/518
2011/0299429 A1* 12/2011  Tiwari ............................ 370/259
(Continued)

FOREIGN PATENT DOCUMENTS

| CN | 101459905 A | 6/2009 |
| CN | 102111856 A | 6/2011 |

(Continued)

OTHER PUBLICATIONS

KPN. "Triggering of not attached device in case of low mobility", 3GPP TSG SA WG2 Meeting 84, TD S2-111735, Apr. 15, 2011 pp. 1-2, Internet: http://www.3gpp.org/ftp/Specs/html-info/TDocExMtg—S2-84—28769.htm.

(Continued)

*Primary Examiner* — Marcos Batista
(74) *Attorney, Agent, or Firm* — Cantor Colburn LLP

(57) ABSTRACT

The present invention provides a method for maintaining a large number of connections. The method comprises: when there is no data transmission between a User Equipment (UE) and a network, a network device deletes a radio bearer and reserves UE context information related to link restoration and a default bearer; when data needs to be transmitted between the UE and the network, the network device establishes a bearer connection with the UE according to the reserved UE context information related to link restoration. At the same time, the present invention provides a UE and system for maintaining a large number of connections. By using the method, the UE and the system of the present invention, a large number of UE connections can be maintained effectively, the network load can be reduced and the connection recovery process can be accelerated.

11 Claims, 5 Drawing Sheets

(56) References Cited

U.S. PATENT DOCUMENTS

2012/0063300 A1* 3/2012 Sahin et al. .................. 370/225
2013/0100895 A1* 4/2013 Aghili ..................... H04W 4/00
370/329

FOREIGN PATENT DOCUMENTS

CN 102165838 A 8/2011
WO 2011050928 A1 5/2011

OTHER PUBLICATIONS

International Search Report for corresponding application PCT/CN2011/082765 filed Nov. 23, 2011; Mail date May 10, 2012.
Extended European Search Report for corresponding application EP 11 86 5423 dated Sep. 10, 2014.
Jaewook Shin, et al., "Design of Session and Bearer Control Signaling in 3GPP LTE System", Vehicular Technology Conference, Sep. 21, 2008, pp. 1-5, XP031352505.
KPN, "Batch wise triggering", 3Gpp Draft: S2-113445, vol. SA WG2, No. Naantali; Jul. 11, 2011; Jul. 5, 2011; XP050548717.
KPN, "Triggering of not attached device in case of low mobility", 3Gpp Draft; S2-111735; vol. SA WG2, No. Bratislava, Apr. 6, 2011, XP050246636.
Nokia, et al., "Preservation of EPS Bearers and MME Context Parameters", 3GPP Draft; S2-072747; vol. SA WG2. No. Orlando Jun. 19, 2007, XP050260281.

* cited by examiner

METHOD, USER EQUIPMENT AND SYSTEM FOR MAINTAINING A LARGE NUMBER OF CONNECTIONS

FIELD OF THE INVENTION

The present invention relates to a Machine to Machine (M2M) technology, and in particular to a method, a User Equipment (UE) and a system for maintaining a large number of connections.

BACKGROUND OF THE INVENTION

M2M technologies refer to all technologies and methods for establishing connections between machines. The concept of M2M appeared early in the 1990s, but remained in a theoretical stage. With the development of mobile communication technologies, it was after the year 2000 that network connections between machines and devices became possible via mobile communication technologies. Around the year 2002, M2M services appeared on the market and developed rapidly in the years that followed to become an attention focus of many communication equipment manufacturers and telecommunication operators. In addition, the number of machines all over the world far exceeds the number of human beings currently. Therefore, it is expected that M2M technologies have good market prospects.

Researches on M2M communication application scenarios have shown that it has potential market prospects to provide M2M communication on mobile networks. In addition, the competition of the telecommunication market is becoming increasingly fierce, fees are decreasing, profits of operators are declining constantly and the human-based communication market is becoming increasingly saturated. Therefore, M2M communication is a brand new development opportunity for the operators.

However, existing mobile communication networks are mainly designed for Human to Human (H2H) communication and the optimization for M2M communication and H2H communication is deficient. Therefore, many new requirements have been raised by M2M services for existing mobile communication systems. In order to enhance the competitiveness of mobile networks in this aspect, it is necessary to optimize the existing mobile communication networks so as to support M2M communication more efficiently. In addition, how to provide M2M communication services by operators at low costs is a key to successful M2M communication deployment.

Based on the analysis above, it is necessary to study solutions for mobile networks to support M2M communication. The solutions must be able to utilize existing networks to the utmost extent while reducing the influence of a large amount of M2M communication to the networks and reducing the complexity of operation and maintenance.

In the related art, in order to utilize existing mobile network resources efficiently, the 3rd Generation Partnership Project (3GPP) has put forward Machine Type Communication (MTC), i.e. services using M2M communication and Machine to Man communication, and the service range far exceeds that of conventional H2H communication. In addition, there are great differences between MTC and existing H2H communication mode in aspects such as access control, charging, safety, Quality of Service (QoS) and service modes etc.

FIG. 1 is a schematic diagram of a framework of a 3GPP Evolved Packet System (EPS). It can be seen from FIG. 1 that the EPS comprises: a Radio Access Network (RAN) and a core network, wherein the RAN may specifically refer to a Universal Mobile Telecommunications System (UMTS) Terrestrial Radio Access Network (UTRAN), an Evolved UTRAN (E-UTRAN), or a Global System for Mobile Communications (GSM)/Enhanced Data rates for GSM Evolution (EDGE) Radio Access Network (GERAN) etc. In the E-UTRAN, an Evolved Node B (eNB) is comprised. For the composition of the core network, in an Evolved Packet Core (EPC) network, i.e. when the RAN is an E-UTRAN, the core network comprises: network elements such as a Mobility Management Entity (MME), a Serving Gateway (S-GW) and a Packet Data Network (PDN) Gateway (P-GW); and in a General Packet Radio Service (GPRS), i.e. when a RAN is an UTRAN or a GERAN, the core network comprises: network elements such as a Serving GPRS Support Node (SGSN) etc.

To realize an MTC system, one of the basic requirements for the MTC system is to maintain connections of a large number of MTC devices efficiently. In other words, the MTC system must provide a mechanism for maintaining connections of a large number of MTC devices efficiently. Therefore, factors of the following three aspects need to be considered: 1. effectiveness; 2. connection maintainability; 3. a large number of MTC devices. Only the second aspect is clear in current researches, i.e. an "always on" state is maintained; for the third aspect, the meaning of "a large number" is unclear, i.e. the quantity of "a large number" is unclear; and for the first aspect, the definition of effectiveness is also unclear. Although the definition of effectiveness is unclear, it can be learned from discussions of previous 3GPP conferences that the requirement of effectiveness is mainly directed at the problem of how to maintain related resources by a network device effectively when a large number of devices are in the "always on" state.

Based on the network framework as shown in FIG. 1, FIG. 2 is a schematic diagram of a framework of an MTC system in 3GPP. As shown in FIG. 2, in the MTC system, links among a UE, an RAN, a Gateway GPRS support Node (GGSN)/P-GW/Evolved Packet Data Gateway (ePDG) and an MTC server need to be maintained, wherein a dashed line "------" indicates the connection of a control plane and a solid line "_"indicates the connection of a user plane in FIG. 2.

In a Long Term Evolution (LTE) network, a UE is in the "always on" state after being attached to the network until the UE is detached, and a network device needs to maintain related information such as context information etc. of the UE in the "always on" state. If a large number of devices are in the "always on" state, then a large amount of context information needs to be maintained inevitably, and thereby a large number of network resources can be occupied. However, there is no technical solution for managing network resources effectively while reducing the occupation of the network resources as much as possible currently.

In addition, when there is no data transmission between the UE and the network device, a radio link bearer may be released or detachment may be performed so as to reduce the occupation to radio resources. However, in related art, after the radio link bearer is released, there is no technical solution for reestablishing a radio connection rapidly when data needs to be transmitted.

SUMMARY OF THE INVENTION

In view of this, the main purpose of the present invention is to provides a method, a UE and a system for maintaining a large number of connections, and thereby connections of a large number of UEs are maintained effectively.

To achieve the purpose above, the present invention provides the following technical solution:

The present invention provides a method for maintaining a large number of connections. The method comprises:

when there is no data transmission between a User Equipment (UE) and a network, a network device deleting a radio bearer and reserving UE context information related to link restoration and a default bearer; and when data needs to be transmitted between the UE and the network, the network device establishing a bearer connection with the UE according to the reserved UE context information related to link restoration.

In the solution above, when a time interval without data transmission between the UE and the network is smaller than a preset threshold, the method further comprises:

the network device further reserving a wire bearer;

wherein the wire bearer comprises: an S1 bearer, an S5/8 bearer and an SGi bearer.

In the solution above, when data transmission needs to be performed between the UE and the network all the time, or when a connection between the UE and the network needs to be maintained according to a subscription attribute of the UE or an operator strategy, the method further comprises:

the network device reserving the radio bearer and reserving all context information of the UE and the wire bearer;

wherein the wire bearer comprises: an S1 bearer, an S5/8 bearer and an SGi bearer.

In the solutions above, said a large number of connections refer to more than two connections.

The present invention further provides a method for maintaining a large number of connections, comprising: when there is no data transmission between a User Equipment (UE) and a network, a network device deleting a radio bearer, and reserving UE context information related to link restoration and a default bearer;

after a fault or a power failure occurs in the network device, discarding all reserved context information of the UE and deleting all bearers, or after the network device initiates a detach process to delete all context information of a large number of UEs and all the bearers because a large amount of UE information is not detected within a specified duration, the method further comprises:

when a Machine Type Communication (MTC) server needs to transmit data to a group of the UEs, sending trigger information to the UEs by the network device to establish connections with the UEs.

In the solution above, sending the trigger information to the UEs by the network device to establish the connections with the UEs comprises:

the MTC server sending the trigger information to the network device;

the network device forwarding the received trigger information and sending the trigger information to the UEs corresponding to the received trigger information; and;

after receiving the trigger information, the UEs initiating an attach process and establishing connections with a network side.

In the solution above, when the network device forwards the received trigger information, the method further comprises:

the network device converting a UE identifier in the received trigger information into an International Mobile Subscriber Identity (IMSI).

The present invention further provides a network device for maintaining a large number of connections. The network device comprises: a deleting unit and a restoring unit, wherein the deleting unit is configured to, when there is no data transmission between a UE and a network, delete a radio bearer and reserve UE context information related to link restoration and a default bearer; and the restoring unit is configured to, when data needs to be transmitted between the UE and the network, establish a bearer connection with the UE according to the reserved UE context information related to link restoration.

The present invention further provides a network device for maintaining a large number of connections. The network device comprises: a deleting unit and a sending unit, wherein the deleting unit is configured to, when there is no data transmission between a User Equipment (UE) and a network, delete a radio bearer and reserve UE context information related to link restoration and a default bearer; and a sending unit is configured to, when all reserved context information of the UE is lost and all bearers are deleted after a fault or a power failure occurs in the network device, or after the network device initiates a detach process to delete all context information of a large number of UEs and all the bearers because a large amount of UE information is not detected within a specified duration and when a Machine Type Communication (MTC) server needs to transmit data to a group of said UEs, forward the received trigger information to the UEs and establish connections between the MTC server and all the UEs.

The present invention further provides a UE for maintaining a large number of connections, the UE includes: a receiving module and a processing module, wherein the receiving module is configured to receive trigger information and send the received trigger information to the processing module; and the processing module is configured to, after receiving the trigger information sent by the receiving module, initiate an attach process and establish a connection with a network side.

The present invention further provides a system for maintaining a large number of connections. The system comprises: a network device, configured to, when there is no data transmission between a UE and a network, delete a radio bearer and reserve UE context information related to link restoration and a default bearer; and when data needs to be transmitted between the UE and the network, establish a bearer connection with the UE according to the reserved UE context information related to link restoration.

In the solution above, the network device is further configured to, when a time interval without data transmission between the UE and the network is smaller than a preset threshold, further reserve a wire bearer.

In the solution above, the network device is further configured to, when data transmission needs to be performed between the UE and the network all the time, or when a connection between the UE and the network needs to be maintained according to a subscription attribute of the UE or an operator strategy, reserve the radio bearer and reserve all context information of the UE and the wire bearer.

The present invention further provides a system for maintaining a large number of connections. The system comprises a network device, an MTC server and a UE, wherein the network device is configured to, when there is no data transmission between the UE and a network, delete a radio bearer and reserve UE context information related to link restoration and a default bearer;

the MTC server is configured to, when all reserved context information of the UE is lost and all bearers are deleted after a fault or a power failure occurs in the network device, or after the network side initiates a detach process to delete all context information of a large number of UEs and all the bearers because a large amount of UE information is not detected within a specified duration and when data needs to be transmitted to a group of the UEs, send trigger information to the UEs via the network device and establish connections between the MTC server and all the UEs; and the UE is configured to, after receiving the trigger information sent by the MTC server via the network device, establish a connection with the MTC server.

In the solution above, the MTC server is specifically configured to, send the trigger information to the network device;

the network device is configured to, after receiving the trigger information sent by the MTC server, forward the received trigger information and send the trigger information to the UE; and the UE is configured to, after receiving the trigger information sent by the network device, initiate an attach process and establish a connection with the network side.

In the solution above, when forwarding the received trigger information, the network device is further configured to convert a UE identifier in the received trigger information into an International Mobile Subscriber Identity (IMSI).

In the solution above, the number of the UEs is two or more than two.

According to the method and the system for maintaining a large number of connections of the present invention, when there is no data transmission between the UE and the network, a pending state is stated, i.e. the network device deletes the radio bearer and reserves UE context information related to link restoration and the default bearer; when data needs to be transmitted between the UE and the network, a recover state is started, i.e. the network device establishes a bearer connection with the UE according to the reserved UE context information related to link restoration. In this way, connections of a large number of UEs can be maintained effectively.

When there is no data transmission between the UE and the network, the network device deletes the radio bearer and reserves the UE context information related to link restoration and the default bearer. Thus the storage space can be saved effectively so as to reduce the network load efficiently. When the data needs to be transmitted between the UE and the network, the network device establishes the bearer connection with the UE according to the reserved UE context information related to link restoration, and thereby the speed of connection restoration is improved.

after a fault or a power failure occurs in the network device, all reserved context information of the UE is lost and all the bearers are deleted, or after the network side initiates a detach process to delete all context information of a large number of UEs and all the bearers because a large amount of UE information is not detected within a specified duration, and when an MTC server needs to transmit data to a group of UEs, trigger information is sent to the UEs by the network device to establish connections with all the UEs. In this way, a large number of UEs can be accessed to the network rapidly.

DETAILED DESCRIPTION OF EMBODIMENTS

The present invention is further described in details as below according to the drawings and embodiments.

In the description below, the UE is a UE having MTC equipment characteristics; herein, the UE as described in the present invention may specifically refer to a device used by a user as described in various mobile communication technologies, e.g. the UE may be a UE in LTE/UTRA or a Mobile Station (MS) in 2G/3G/GREAN. Generally, the number of machines far exceeds the number of human beings, e.g. more than 2 orders of magnitude higher. If not specified, a large number of connections in the present invention refer to more than one connections, i.e. a large number of connections refer to two connections or more than two connections.

Figure 1:
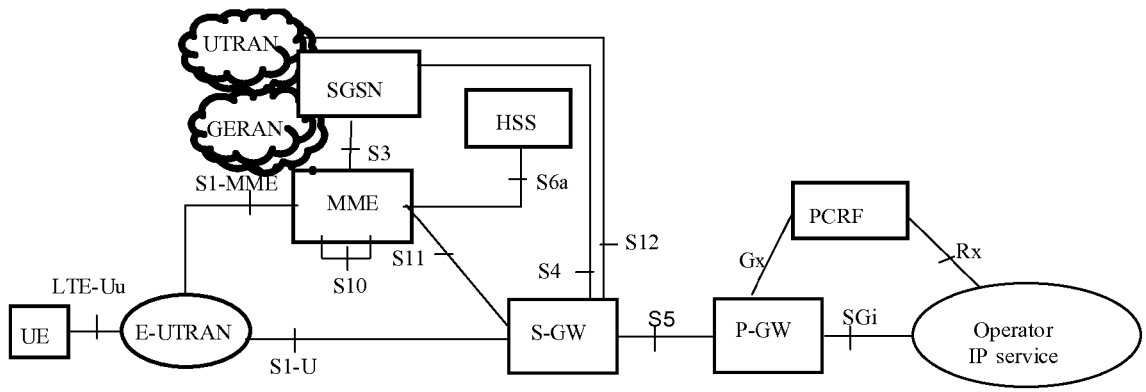
FIG. 1 is a schematic diagram of a framework of a 3GPP EPS in the related art.
Figure 2:
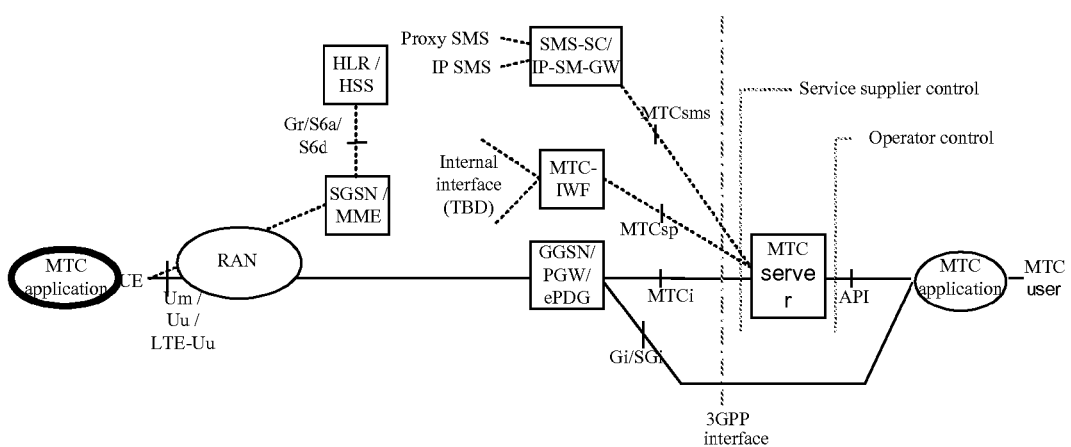
FIG. 2 is a schematic diagram of a framework of a 3GPP MTC system in the related art.
Figure 3:
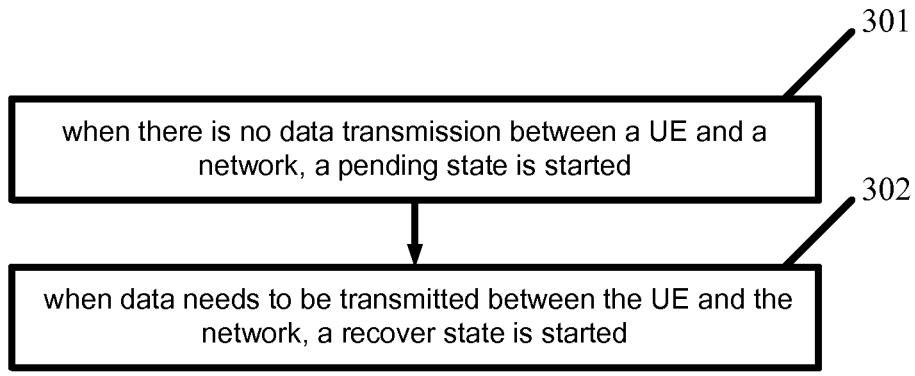
FIG. 3 is a flowchart of a method for maintaining a large number of connections in the present invention.

The method for maintaining a large number of connections of the present invention is as shown in FIG. 3 and comprises the steps as follows.

Step 301: when there is no data transmission between the UE and the network, a pending state is started.

Herein, no data transmission is that: the UE ends transmitting and/or receiving data, or a network device ends transmitting and/or receiving data. If the UE ends transmitting and/or receiving data, the network device needs to be notified; and correspondingly, if the network device ends transmitting and/or receiving data, the UE needs to be notified.

Starting the pending state specifically comprises:

the network device deletes a radio bearer and reserves UE context information related to link restoration and a default bearer.

In the above, the network device may comprise: all devices needed to realize data transmission between the UE and an MTC server, e.g. a RAN device, an MME/SGSN, an S-GW/P-GW, a Home Subscriber Server (HSS)/Home Location Register (HLR), MTC Interworking Function (MTC IWF) and a Service Center (SC) etc. The RAN device may specifically refer to an eNB. During actual applications, according to different deployed networks, there may be different network devices. The network devices may be network devices which constitutes a 3GPP network. Which devices the network devices comprise is not a content concerned by the present invention. During actual applications, the context information of the UE comprises: an IMSI, an International Mobile Equipment Identity (IMEI), subscription information, a mobility management state, a Globally Unique Temporary Identity (GUTI), a tracking area list, a last visited tracking area ID, Discontinuous Reception (DRX) parameters and security parameters etc. The context information of the UE may be stored in said one network device or more than one network devices. For the UE context information related to link restoration, according to service requirements, and the MTC characteristics and a strategy of the UE, an operator determines which UE context information is the UE context information related to link restoration.

The default bearer is a bearer in an S5/8 interface, i.e. a bearer between an S-GW and a P-GW. During an attach process of the UE, the default bearer is established.

Herein, when a time interval without data transmission between the UE and the network is smaller than a preset threshold, the method may further comprise the followings.

The network device further reserves a wire bearer, wherein the threshold may be set according to requirements. The wire bearer comprises: an S1 bearer, an S5/8 bearer and an SGi bearer.

Step 302: when data needs to be transmitted between the UE and the network, a recover state is started.

Herein, the data transmission is that: the UE transmits and/or receives data, or the network device transmits and/or receives data; a trigger process may need to be performed if data is transmitted by the network device.

Starting the recover state specifically refers to:

the network device establishes a bearer connection with the UE according to the reserved UE context information related to link restoration.

In the above, a specific processing process of establishing the bearer connection with the UE according to the reserved UE context information related to link restoration may adopt the related art. The radio bearer comprises: an air interface bearer.

When data transmission needs to be performed between the UE and the network all the time, or when a connection between the UE and the network needs to be maintained all the time according to a subscription attribute of the UE or an operator strategy, the method may further comprise:

the network device reserves the radio bearer and reserves all context information of the UE and the wire bearer.

The wire bearer comprises: an S1 bearer, an S5/8 bearer and an SGi bearer.

The present invention further provides a method for maintaining a large number of connections, and the method comprises the followings.

When there is no data transmission between the UE and the network, the network device deletes the radio bearer, and reserves UE context information related to link restoration and the default bearer.

After a fault or a power failure occurs in the network device, all reserved context information of the UE is lost and all the bearers are deleted, or after the network device initiates a detach process to delete all context information of a large number of UEs and all the bearers because a large amount of UE information is not detected within a specified duration and when the MTC server needs to transmit data to a group of said UEs, trigger information is sent to the UEs by the network device to establish connections with all the UEs.

More specifically, the MTC server transmits the trigger information to the network device.

The network device forwards the received trigger information and sends the trigger information to the UEs corresponding to the received trigger information.

After receiving the trigger information, the UEs initiate an attach process and establish connections with a network side.

In the above, the trigger information sent by the MTC server to the network device is that: information for multiple UEs is comprised in one piece of trigger information.

When the network device forwards the received trigger information, the method may further comprise:

the network device converts a UE identifier in the received trigger information into an IMSI so that the network device can send the trigger information to the UE.

The present invention is further described in details below according to embodiments.

Embodiment I

Figure 4:
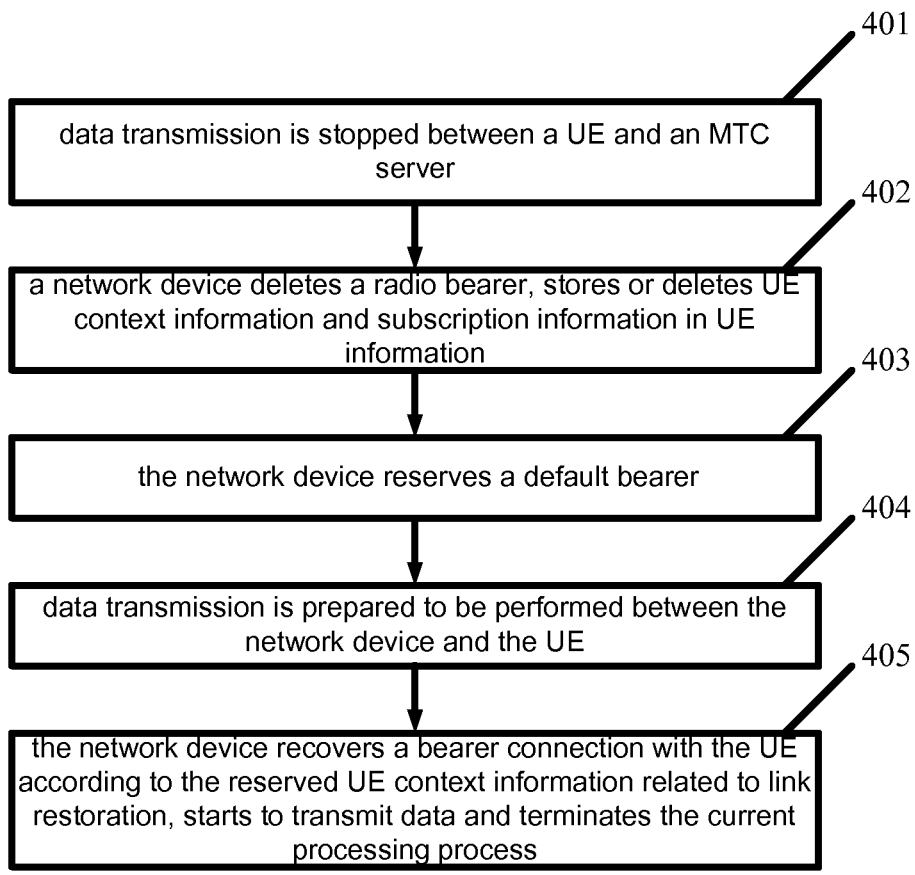
FIG. 4 is a flowchart of a method for maintaining a large number of connections in Embodiment I.

In this embodiment, the UE is a UE having a time control characteristic, i.e. the network device has specified when the UE may communicate with the network device. The method for maintaining a large number of connections in the embodiment is as shown in FIG. 4, and the method comprises the steps as follows.

Step 401: data transmission is stopped between the UE and the MTC server.

Herein, the reason of stopping the data transmission may be: a grant time interval is over, a forbidden time interval is started, or the data transmission is completed in the grant time interval or a communication window etc.

If the UE stops transmitting or receiving data, the UE sends indication information to the network device; and if the MTC server stops transmitting or receiving data, the MTC server sends the indication information to the UE via the network device, wherein the indication information may comprise: time information of the next data transmission.

Step 402: the network device deletes the radio bearer, stores or deletes UE context information and subscription information in UE information and Step 403 is performed subsequently.

Herein, a specific processing process of deleting the radio bearer by the network device may adopt the related art.

Since the UE context information is stored on different network devices, each network device determines to store or delete the UE context information and the subscription information in the UE information according to requirements. More specifically, if the UE is in the grant time interval or the communication window currently, or the forbidden time interval is smaller than or equal to a preset threshold, all network devices reserve their own stored UE context information and reserve the subscription information in the UE information; if the UE is not in the grant time interval or the communication window currently, or the forbidden time interval is greater than the preset threshold, the network device which stores the UE context information related to link restoration reserves the UE context information related to link restoration, and the network device which does not store the UE context information related to link restoration deletes the UE context information and deletes the subscription information, wherein the threshold is set according to requirements, i.e. the threshold may be set as 10 min etc. The network device learns the state of the UE in advance and accordingly learns whether the UE is in the grant time interval or in the communication window currently, and learns the forbidden time interval of the UE.

The UE context information may be stored in an eNB and/or an MME, i.e. the network device comprises: an eNB, and an MME. The UE information is: identification information of the UE and subscription information. The UE information specifically comprises: an IMSI, an IMEI, subscription information and QoS etc. The UE information is stored in an HSS or an HLR.

A specific process for deleting the UE context information, and the subscription information in the UE information is the related art, which will not be repeated here.

Step 403: the network device reserves the default bearer and Step 404 is performed subsequently.

Herein, it should be noted that the network device reserves the default bearer and may delete a dedicated bearer which is a bearer configured to transmit data, besides the default bearer. A process for deleting the dedicated bearer may be initiated by the MME or the SGSN and the specific processing process may adopt the related art.

Step 404: data transmission is prepared to be performed between the network device and the UE and Step 405 is performed subsequently.

Herein, the data transmission may be initiated by the UE or the network device. If the data transmission is initiated by the network device, a trigger process may need to be performed to request the UE to establish a connection, wherein specific processing of initiating the data transmission by the network device may adopt the related art and specific implementation of the trigger process may refer to Embodiment III.

Step 405: the network device recovers the bearer connection with the UE according to the reserved UE context information related to link restoration, starts to transmit data and terminates the current processing process.

Herein, the bearer comprises: an air interface bearer, an S1 bearer, and an SGi bearer and may further comprise: a dedicated bearer.

It should be noted that, if the UE is in the forbidden time interval currently, the operation of the present step is started only when the UE is in the grant time interval.

Embodiment II

Figure 5:
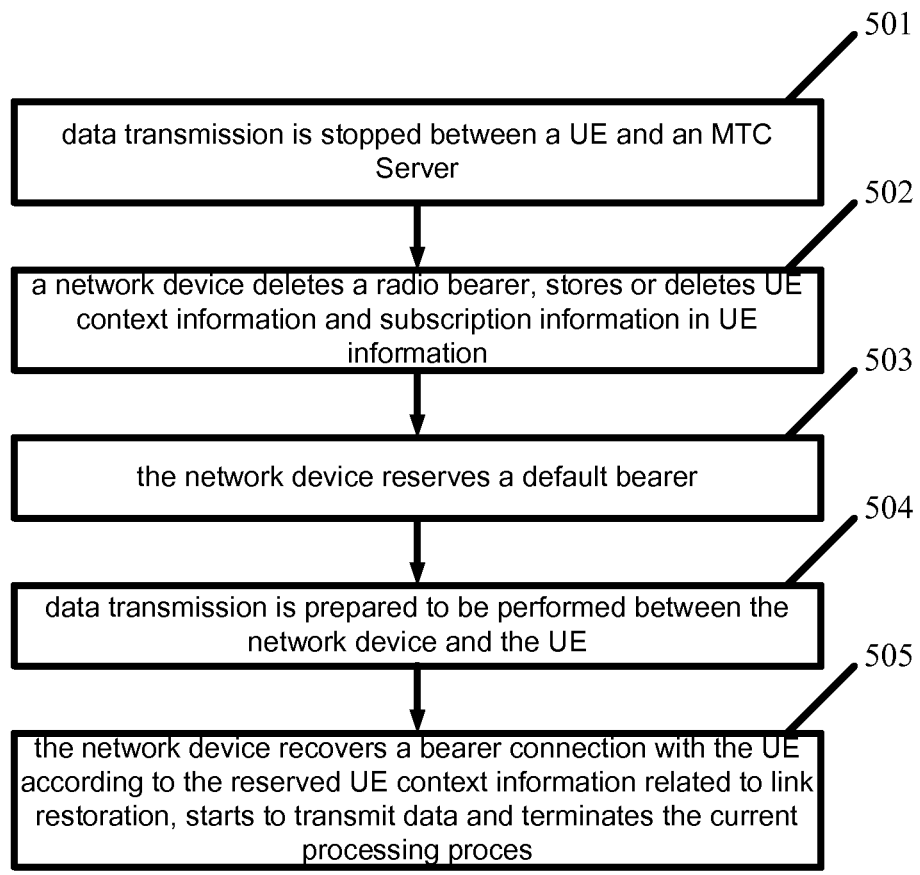
FIG. 5 is a flowchart of a method for maintaining a large number of connections in Embodiment II.

In this embodiment, the UE is a UE which performs data transmission with the network device after a long time interval, i.e. the time interval is greater than a set threshold. The method for maintaining a large number of connections is as shown in FIG. 5 and the method comprises the steps as follows.

Step 501: data transmission is stopped between the UE and the MTC Server.

If the UE stops transmitting or receiving data, the UE transmits indication information to the network; or if the MTC server stops transmitting or receiving data, the MTC server transmits indication information to the UE, wherein the indication information may comprise time information of the next prepared data transmission.

Step 502: the network device deletes the radio bearer, stores or deletes UE context information and UE information.

Herein, a specific processing process of deleting the radio bearer by the network device may adopt the related art.

Since the UE context information is stored on different network devices, each network device determines to store or delete the UE context information, and the subscription information in the UE information according to requirements. More specifically, the network device which stores the UE context information related to link restoration reserves the UE context information related to link restoration, and the network device which does not store the UE context information related to link restoration deletes the UE context information and deletes the subscription information.

The UE context information may be stored in an eNB and/or an MME, i.e. the network device comprises: an eNB, and an MME. The UE information is stored in an HSS or an HLR.

Step 503: the network device reserves the default bearer and Step 504 is performed subsequently.

Herein, it should be noted that the network device reserves the default bearer and may delete the dedicated bearer which is a bearer configured to transmit data, besides the default bearer. A process for deleting the dedicated bearer may be initiated by the MME or the SGSN and the specific processing process may adopt the related art.

Step 504: data transmission is prepared to be performed between the network device and the UE.

The data transmission may be initiated by the UE or the network device. If the data transmission is initiated by the network device, a trigger process may need to be performed to request the UE to establish a connection, wherein specific processing of initiating the data transmission by the network device may adopt the related art and specific implementation of the trigger process may refer to Embodiment III.

Step 505: the network device recovers the bearer connection with the UE according to the reserved UE context information related to link restoration, starts to transmit data and terminates the current processing process.

Herein, the bearer comprises: an air interface bearer, an S1 bearer, and an SGi bearer and may further comprise: a dedicated bearer.

Embodiment III

Figure 6:
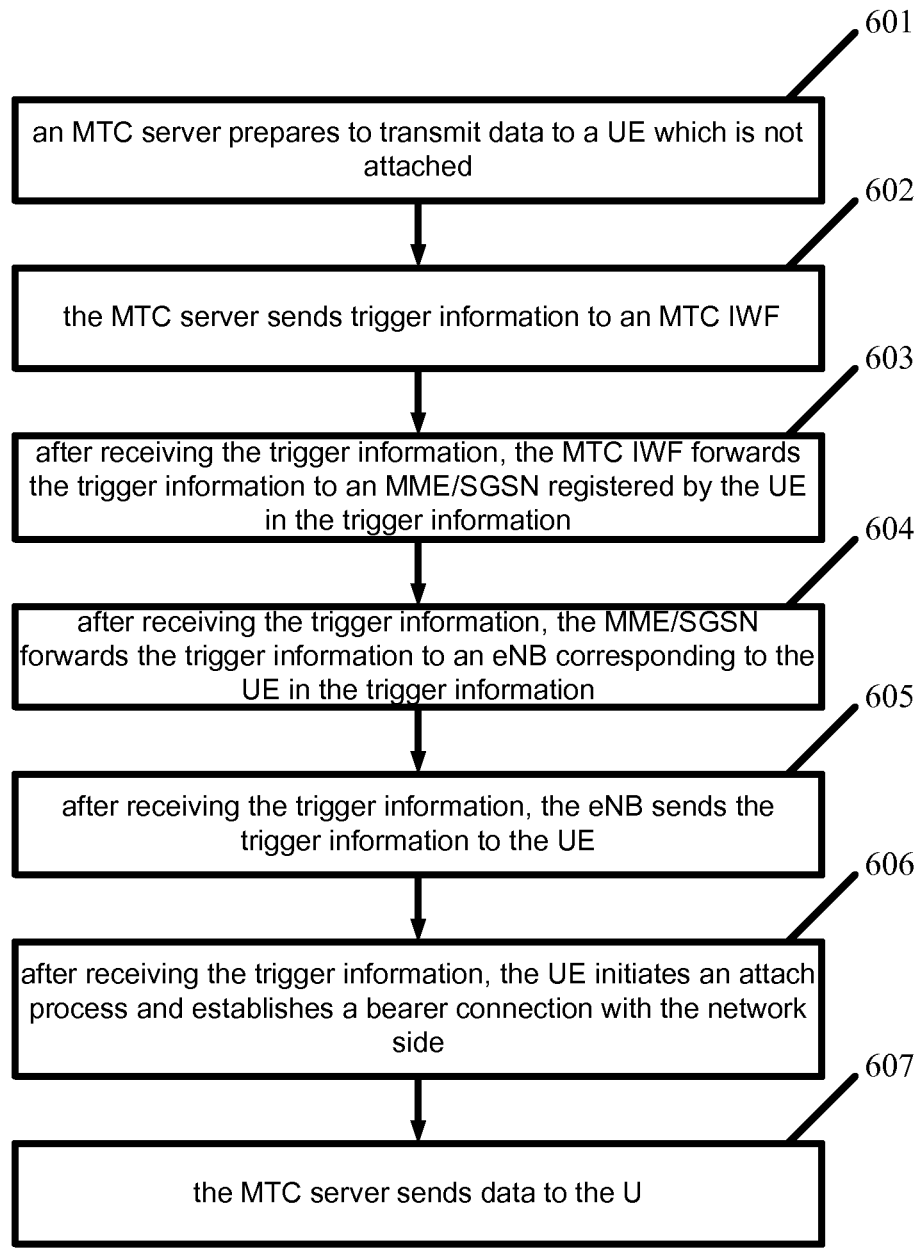
FIG. 6 is a flowchart of a method for maintaining a large number of connections in Embodiment III.

Application scenarios of this embodiment is that: after a fault or a power failure occurs in the network device, all reserved context information of the UE is lost and all the bearers are deleted, or the network device initiates a detach process to delete all context information of a large number of UEs and all the bearers because a large amount of UE information is not detected within a specified duration; the MTC server needs to send data to these UEs which are not detached. Herein, the network device is a network device in a 3GPP network and the detach process may be performed visibly or invisibly. A specific detach process is the related art. The method for maintaining a large number of connections of the embodiment is as shown in FIG. 6 and the method comprises the steps as follows.

Step 601: the MTC server prepares to transmit data to the UE which is not attached and Step 602 is performed subsequently.

Step 602: the MTC server sends trigger information to an MTC IWF.

Herein, considering that a large number of UEs which are not attached need to be triggered and requested, trigger information for multiple UEs is comprised in the trigger information.

Step 603: after receiving the trigger information, the MTC IWF forwards the trigger information to the MME/SGSN registered by the UE in the trigger information.

Herein, in the 3GPP network, the MTC IWF converts a UE identifier in the trigger information into an IMSI, and then forwards the trigger information to the MME/SGSN registered by the UE in the trigger information, wherein the MTC IWF stores the IMSI of the UE in advance, or the MTC IWF obtains the IMSI of the UE via an HSS/HLR request so as to convert the UE identifier in the trigger information into the IMSI accordingly.

The MTC IWF may enquire the UE information via the HSS/HLR to obtain the corresponding MME/SGSN, so as to forward the trigger information to the corresponding MME/SGSN.

If the UEs in the trigger information are registered on the same MME/SGSN, the MTC IWF sends the trigger information to the MME/SGSN. If the UEs in the trigger information are registered on multiple MMEs/SGSNs, the MTC IWF sends the trigger information to multiple registered MMEs/SGSNs.

Step 604: after receiving the trigger information, the MME/SGSN forwards the trigger information to an eNB corresponding to the UE in the trigger information.

Step 605: after receiving the trigger information, the eNB sends the trigger information to the UE.

Step 606: after receiving the trigger information, the UE initiates an attach process and establishes a bearer connection with the network side, and Step 607 is performed subsequently.

Herein, the bearer comprises: an air interface bearer, an S1 bearer, and an SGi bearer and may further comprise: a dedicated bearer.

A specific processing process of establishing the bearer connection with the network side may adopt the related art.

Step 607: the MTC server sends data to the UE.

To realize the method above, a network device for maintaining a large number of connections is provided, wherein the network device comprises: a deleting unit and a restoring unit, wherein the deleting unit is configured to, when there is no data transmission between a UE and a network, delete a radio bearer and reserves UE context information related to link restoration and a default bearer; and the restoring unit is configured to, when data needs to be transmitted between the UE and the network, establish a bearer connection with the UE according to the reserved UE context information related to link restoration.

In the above, the deleting unit is further configured to, when a time interval without data transmission between the UE and the network is smaller than a preset threshold, further reserve a wire bearer, wherein the wire bearer comprises: an S1 bearer, an S5/8 bearer and an SGi bearer.

The deleting unit is further configured to, when data transmission needs to be performed between the UE and the network all the time, or when a connection between the UE and the network needs to be maintained all the time according to a subscription attribute of the UE or an operator strategy, reserve the radio bearer and reserve all context information of the UE and the wire bearer, wherein the wire bearer comprises: an S1 bearer, an S5/8 bearer and an SGi bearer.

Based on the network device above, the present invention further provides a system for maintaining a large number of connections. The system comprises: a network device, configured to, when there is no data transmission between a UE and a network, delete a radio bearer and reserves UE context information related to link restoration and a default bearer; and when data needs to be transmitted between the UE and the network, establish a bearer connection with the UE according to the reserved UE context information related to link restoration.

Herein, it should be noted that the UE is a UE having MTC equipment characteristics and the number of the UEs may be 2 or more than 2.

In the above, the network device is further configured to, when a time interval without data transmission between the UE and the network is smaller than a preset threshold, further reserve a wire bearer.

The network device is further configured to, when data transmission needs to be performed between the UE and the network all the time, or when a connection between the UE and the network needs to be maintained all the time according to a subscription attribute of the UE or an operator strategy, reserve the radio bearer and reserve all context information of the UE and the wire bearer.

Herein, it should be noted that, the network device may comprise: all devices needed to realize data transmission between the UE and the MTC server, e.g. a RAN device, an MME/SGSN, an S-GW/P-GW, an HSS/HLR, MTC IWF and an SC etc. The RAN device may specifically refer to an eNB. In actual applications, according to different deployed networks, there may be different network devices. The network devices may be network devices which constitute a 3GPP network. Which devices the network device comprises is not a content concerned by the present invention. In actual applications, the context information of the UE comprises: an IMSI, an IMEI, subscription information, a mobility management state, a GUTI, a tracking area list, a last visited tracking area ID, DRX parameters and security parameters etc. The context information of the UE may be stored in more than one said network devices. For the UE context information related to link restoration, according to service requirements, and the MTC characteristics of the UE and a strategy, an operator determines which UE context information is the UE context information related to link restoration.

The present invention further provides a network device for maintaining a large number of connections. The network device comprises: a deleting unit and a sending unit, wherein the deleting unit is configured to, when there is no data transmission between a UE and a network, delete a radio bearer and reserves UE context information related to link restoration and a default bearer; and a sending unit is configured to, when all reserved context information of the UE is lost and all the bearers are deleted after a fault or a power failure occurs in the network device, or after the network device initiates a detach process to delete all context information of a large number of UEs and all the bearers because a large amount of UE information is not detected within a specified duration and when an MTC server needs to transmit data to a group of said UEs, forward the received trigger information to the UEs and establish connections between the MTC servers and all UEs above.

Figure 7:
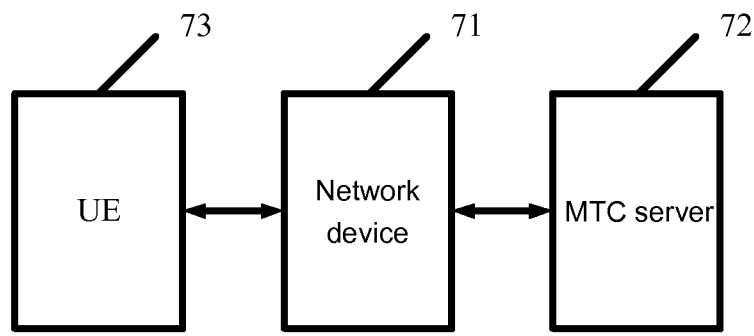
FIG. 7 is a schematic structural diagram of a system for maintaining a large number of connections in the present invention.

Based on the network device above, the present invention further provides a system for maintaining a large number of connections. As shown in FIG. 7, the system comprises: a network device 71, an MTC server 72 and a UE 73, wherein the network device 71 is configured to, when there is no data transmission between a UE and a network, delete a radio bearer and reserves UE context information related to link restoration and a default bearer;

the MTC server 72 is configured to, when all reserved context information of the UE is lost and all the bearers are deleted after a fault or a power failure occurs in the network device, or after the network device 71 initiates a detach process to delete all context information of a large number of UEs and all the bearers because a large amount of UE information is not detected within a specified duration and when data needs to be transmitted to a group of said UEs which are not attached, send trigger information to the UEs 73 via the network device 71 and establish connections with all UEs 73; and the UE 73 is configured to, after receiving the trigger information sent by the MTC server 72 via the network device 71, establish a connection with the MTC server.

Herein, it should be noted that: the UE is a UE having MTC equipment characteristics and the number of the UEs may be 2 or more than 2.

Wherein the MTC server 72 is specifically configured to, send the trigger information to the network device 71.

The network device 71 is specifically configured to, after receiving the trigger information sent by the MTC server 72, forward the received trigger information and send the trigger information to the UE 73.

The UE 73 is specifically configured to, after receiving the trigger information sent by the network device 71, initiate an attach process and establish a connection with the network side.

In the above, when forwarding the received trigger information, the network device 71 is further configured to convert a UE identifier in the received trigger information into an IMSI.

The present invention further provides a UE for maintaining a large number of connections. The UE comprises: a receiving module and a processing module, wherein the receiving module is configured to receive trigger information and send the received trigger information to the processing module; and the processing module is configured to, after receiving the trigger information sent by the receiving module, initiate an attach process and establish a connection with a network side.

In the above, the receiving module is further configured to receive data.

The UE may further comprise: a sending module configured to send data.

The above are only preferred embodiments of the present invention and should not be used to limit the scope of protection present invention.

What is claimed is:

1. A method for maintaining a large number of connections in a Machine Type Communication (MTC) system, comprising:
    when there is no data transmission between a User Equipment (UE) and an MTC server, a network device for transmitting data between the UE and the MTC server deleting a radio bearer and reserving UE context information related to link restoration and a default bearer; and
    when data needs to be transmitted between the UE and the MTC server, the network device establishing a bearer connection with the UE according to the reserved UE context information related to link restoration;
    wherein the large number of connections refer to more than two connections.

2. The method according to claim 1, wherein when a time interval without data transmission between the UE and the network is smaller than a preset threshold, the method further comprises:
    the network device further reserving a wire bearer;
    wherein the wire bearer comprises: an S1 bearer, an S5/8 bearer and an SGi bearer.

3. The method according to claim 1, wherein when data transmission needs to be performed between the UE and the network all the time, or when a connection between the UE and the network needs to be maintained according to a subscription attribute of the UE or an operator strategy, the method further comprises:
    the network device reserving the radio bearer and reserving all context information of the UE and the wire bearer;
    wherein the wire bearer comprises: an S1 bearer, an S5/8 bearer and an SGi bearer.

4. A method for maintaining a large number of connections in a Machine Type Communication (MTC) system, comprising:
    when there is no data transmission between a User Equipment (UE) and an MTC server, a network device for transmitting data between the UE and the MTC server deleting a radio bearer, and reserving UE context information related to link restoration and a default bearer;
    after a fault or a power failure occurs in the network device, discarding all reserved context information of the UE and deleting all bearers, or after the network device initiates a detach process to delete all context information of a large number of UEs and all the bearers because a large amount of UE information is not detected within a specified duration, the method further comprises:
    when a Machine Type Communication (MTC) server needs to transmit data to a group of the UEs, sending trigger information to the UEs by the network device to establish connections with the UEs.

5. The method according to claim 4, wherein sending the trigger information to the UEs by the network device to establish the connections with the UEs comprises:
    the MTC server sending the trigger information to the network device;
    the network device forwarding the received trigger information and sending the trigger information to the UEs corresponding to the received trigger information; and
    after receiving the trigger information, the UEs initiating an attach process and establishing connections with a network side.

6. The method according to claim 5, wherein when the network device forwards the received trigger information, the method further comprises:
    the network device converting a UE identifier in the received trigger information into an International Mobile Subscriber Identity (IMSI).

7. The method according to claim 4, wherein said a large number of connections refer to more than two connections.

8. A Machine Type Communication (MTC) system for maintaining a large number of connections, comprising a Machine Type Communication (MTC) server, and a User Equipment (UE) and a network for transmitting data between the UE and the MTC server, wherein
    the network device is configured to, when there is no data transmission between the UE and the MTC server, delete a radio bearer and reserve UE context information related to link restoration and a default bearer;
    the MTC server is configured to, when all reserved context information of the UE is lost and all bearers are deleted after a fault or a power failure occurs in the network device, or after the network side initiates a detach process to delete all context information of a large number of UEs and all the bearers because a large amount of UE information is not detected within a specified duration and when data needs to be transmitted to a group of the UEs, send trigger information to the UEs via the network device and establish connections between the MTC server and all the UEs; and
    the UE is configured to, after receiving the trigger information sent by the MTC server via the network device, establish a connection with the MTC server;
    wherein the large number of connections refer to more than two connections.

9. The system according to claim 8, wherein the MTC server; is configured to, send the trigger information to the network device;
    the network device is configured to, after receiving the trigger information sent by the MTC server, forward the received trigger information and send the trigger information to the UE; and
    the UE is configured to, after receiving the trigger information sent by the network device, initiate an attach process and establish a connection with the network side.

10. The system according to claim 9, wherein when forwarding the received trigger information, the network device is further configured to convert a UE identifier in the received trigger information into an International Mobile Subscriber Identity (IMSI).

11. The system according to claim 8, wherein the number of the UEs is two or more than two.

* * * * *